Figure 3:
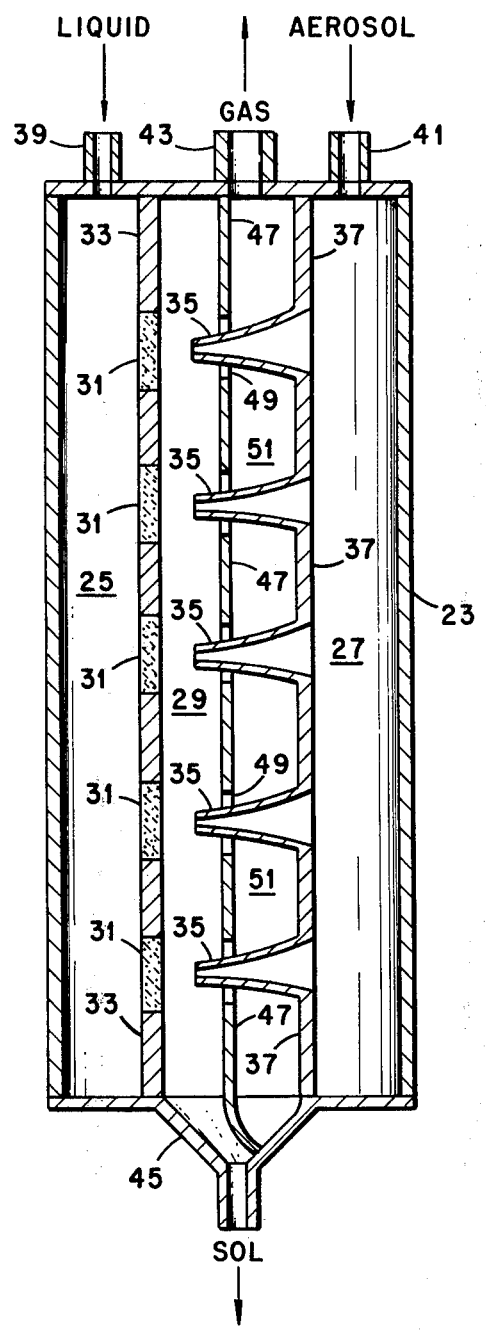

United States Patent [19]

McDowell et al.

[11] 4,012,209
[45] Mar. 15, 1977

[54] LIQUID FILM TARGET IMPINGEMENT SCRUBBER

[75] Inventors: William J. McDowell, Knoxville; Charles F. Coleman, Oak Ridge, both of Tenn.

[73] Assignee: The United States of America as represented by the United States Energy Research and Development Administration, Washington, D.C.

[22] Filed: Apr. 5, 1976

[21] Appl. No.: 674,200

[52] U.S. Cl. .................................. 55/240; 55/242; 55/465; 261/99; 261/107
[51] Int. Cl.² ......................................... B01D 47/00
[58] Field of Search ............... 55/90, 91, 233, 240, 55/242, 270, 465; 261/95, 99, 104, 107

[56] References Cited

UNITED STATES PATENTS

| 1,677,265 | 7/1928 | Boving | 55/240 |
| 3,060,595 | 10/1962 | Dapses | 55/468 |
| 3,403,498 | 10/1968 | Pasha | 55/90 |
| 3,853,506 | 12/1974 | Pircon | 55/91 |
| 3,888,955 | 6/1975 | Maruko | 261/99 |

FOREIGN PATENTS OR APPLICATIONS 695,445  9/1930  France .................................. 55/240

*Primary Examiner*—Bernard Nozick
*Attorney, Agent, or Firm*—Dean E. Carlson; David S. Zachry; David E. Breeden

[57] ABSTRACT

An improved liquid film impingement scrubber is provided wherein particulates suspended in a gas are removed by jetting the particle-containing gas onto a relatively small thin liquid layer impingement target surface. The impingement target is in the form of a porous material which allows a suitable contacting liquid from a pressurized chamber to exude therethrough to form a thin liquid film target surface. The gas-supported particles collected by impingement of the gas on the target are continuously removed and flushed from the system by the liquid flow through each of a number of pores in the target.

4 Claims, 3 Drawing Figures

Fig. 1

Fig. 2

LIQUID FILM TARGET IMPINGEMENT SCRUBBER

This invention was made during the course of, or under, a contract with the Energy Research and Development Administration.

BACKGROUND OF THE INVENTION

This invention relates generally to the art of gas scrubbers for removing particulates from aerosols and more specifically to gas scrubbers of the type generally referred to as impingement separators or particle impactors in which the particle-containing gas is jetted into a liquid film for particulate removal by the liquid film.

In the art of removal of particles suspended in a gas the usual methods include sedimentation by gravity or by centrifugation, filtration, electrostatic collection and water-spray scrubbing. In the case of collection of particles suspended in large volumes of gas with relatively small volumes of liquid the usual method is that of impingement of the particles into a small, fixed volume of liquid by means of a gas jet. Even in this type of collector, it is necessary to rinse the liquid container to transfer all of the collected particles, thus increasing the final volume and interrupting the operation. In a static liquid impinger, unwanted chemical and physical changes, such as deterioration or saturation of, or resuspension from the liquid can also occur.

There is a need for an impingement type scrubber in which particulates may be removed from gas suspension continuously in an apparatus which does not require interruption for rinsing with the attendant dilution of the collected particles, and will minimize effects of aging, saturation, or resuspension.

SUMMARY OF THE INVENTION

In view of the above need, it is an object of this invention to provide an improved liquid film impingement scrubber wherein a liquid-permeable impact body is provided which permits the jetted gas, containing suspended particles, to impinge upon a film of liquid exuding through said body to continuously flush collected particles from the impact body, thus eliminating the necessity of rinsing the impact body.

Other objects and many of the attendant advantages of the present invention will be obvious to those skilled in the art from the following detailed description taken in conjunction with the drawings.

BRIEF DESCRIPTION OF THE DRAWINGS

Figures 1, 2:
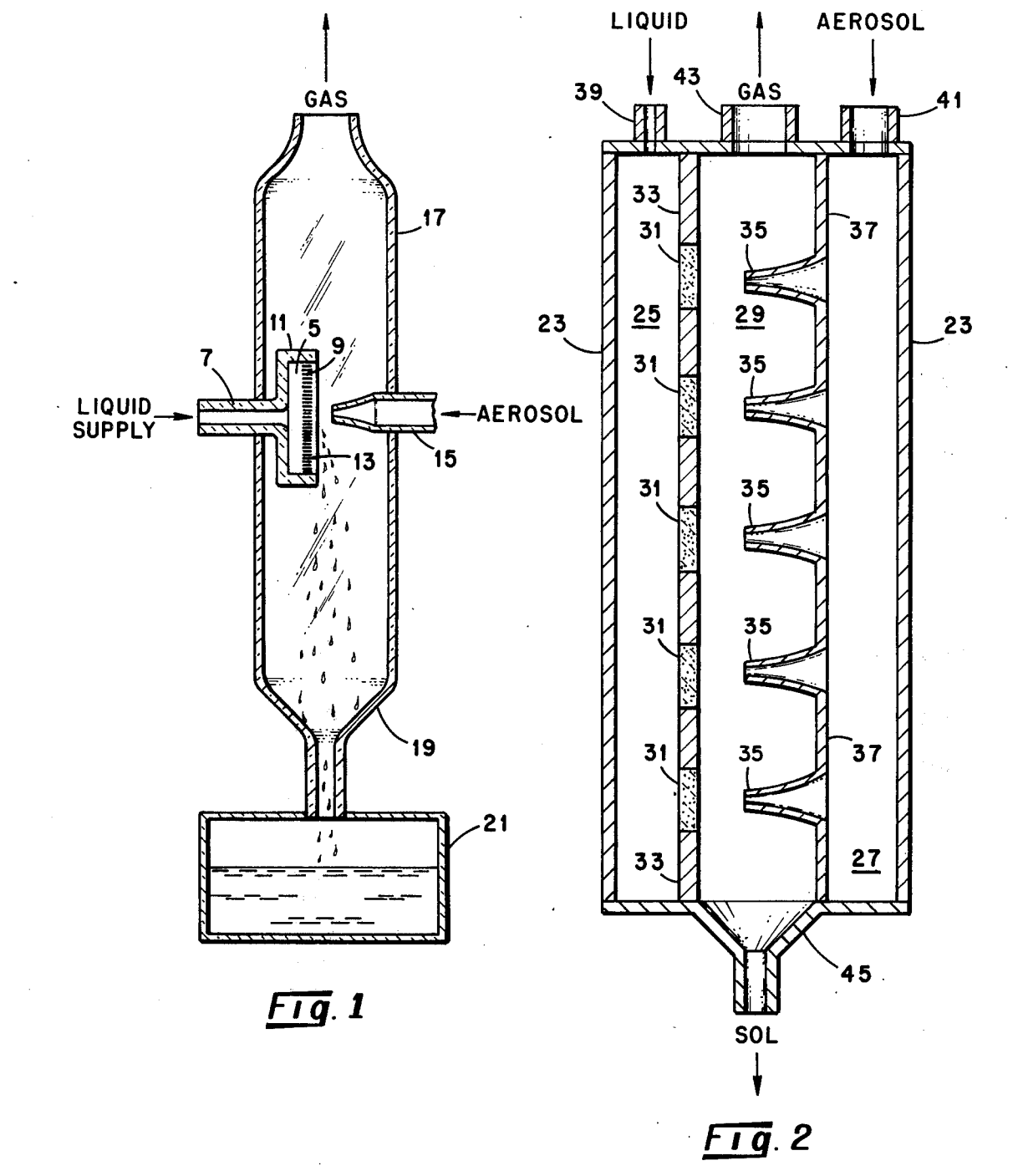

FIG. 1 is a cross-sectioned elevation view of a single unit liquid film impingement scrubber including the improved liquid permeable impingement target.

FIG. 2 is a cross-sectioned elevation view of a multi-unit liquid film impingement scrubber employing the improvement according to the present invention.

FIG. 3 is a cross-sectioned elevation view of the scrubber of FIG. 2 with an addition of a baffle to isolate the gas flow effects at each impingement unit.

DETAILED DESCRIPTION

Referring now to FIG. 1, the liquid supply may be essentially any pressurizable container, pipe, tank, or extension of a pressurized system which feeds the liquid chamber 5 connected to the liquid supply by means of pipe 7. Although the chamber 5 and consequently a target 9 which closes one end of the chamber 5 may take various forms, it will be illustrated here as a cylindrical section 11 connected at the opposite end to the supplying line 7. Thus, the foraminous plate target 9 is a disc which may be formed of fritted porous metal, glass, ceramic or plastic plate, or an inert woven fabric. Although the disc 9 is porous, the gas contacting surface 13 is preferably flat and smooth to minimize surface area and to provide good rinse and decontamination characteristics. The aerosol containing the particles to be collected in the film of liquid exuding from the face 13 of the foraminous target 9 is directed at the surface 13 in the form of a jet through a nozzle 15. It is preferable that it deliver the aerosol to the impingement surface 13 in a streamline flow to minimize turbulence prior to impact. Linear flow rates required for efficient impaction of various single suspended particles in an aerosol jet are well known and readily available in the literature.

The impingement target 13 is enclosed within a suitable housing 17 from which the gas is allowed to escape at the upper end and formed at the lower end as a drip-catching vessel, such as a funnel-shaped end portion 19 formed below the foraminous plate 9. The collector portion directs the particle-laden liquid or sol which drips from the plate surface 13 to a liquid-collecting chamber 21. Another form is that of one or more capillaries (not shown) that may be connected to a vacuum system for delivery of the liquid to a remote monitoring location.

Referring now to FIG. 2, there is shown a three-compartmented housing 23 for a multi-unit liquid film impingement scrubber according to the present invention. The three compartments within the housing 23 include a liquid header 25, an aerosol header 27 and an impacting and liquid-collecting chamber 29. A plurality of foraminous plates 31 are provided in a wall 33 common to, and between, the liquid header 25 and the impacting chamber 29. A plurality of aerosol jet nozzles 35 are formed in a wall 37 common to, and between, the aerosol header 27 and the impacting chamber 29, each in alignment with a respective one of the corresponding plurality of plates 31. A liquid inlet 39 is provided to the liquid header 25; an aerosol inlet 41 is provided to the aerosol header 27; and a gas outlet 43 is provided from the impingement chamber 29. The inlets and outlets are formed in the upper end closure of the housing 23. The lower end of housing 23 is provided with a funneled liquid collector portion 45 which directs the particle-laden liquid from the impingement chamber to a collector which may take various forms, such as the reservoir collector 21 as shown in FIG. 1.

The embodiment of FIG. 2 operates in the same manner as described above with reference to FIG. 1, each aerosol nozzle 35 and corresponding impingement plate 31 acting as a single unit as described in FIG. 1.

Referring now to FIG. 3, an embodiment similar to that shown in FIG. 2 is illustrated with like parts having identical reference numbers, wherein a baffle plate 47 is inserted in the impingement chamber 29, thus forming an exhaust chamber 51 from which the gas exhausts through outlet 42. The plate 47 is provided with oversize openings 49 corresponding to the location of each nozzle 35 and aligned so that a portion of each nozzle extends through the oversize openings 49 allowing the scrubbed gas to flow back along the outer walls of the nozzle 35 through openings 49 to the gas outlet 43. The impingement chamber 29 remains in liquid communication with the liquid exit 45, as in FIG. 2.

The purpose of the baffle 47 is to isolate and separate the action of each impingement unit so that the gas flow toward the outlet 43 from the nozzle farthest from outlet 43 does not interfere with and disrupt the flow patterns around and, thus, the action of the nozzles nearer to outlet 43.

radioactive material was found on the exit filter in any of the tests.

EXAMPLE II

A test similar to Example I was performed with a radioactive ($^{47}$Ca tag) aerosol of n-octane of size range 0.2 to 0.4 micron diameter. The results are also shown in the table.

TABLE

| Aerosol Type | Aerosol Flow L/min | Aerosol Head Pressure | Counts/10 Min. | | |
|---|---|---|---|---|---|
| | | | Std. (Glass Wool) Plug | Impactor | Percent Collected |
| Example I (Aqueous) | 3.0 | 2.0 psi | 78,420 | 77,165 | 98.4 |
| | | | 75,620 | 75,195 | 99.4 |
| | | | 74,485 | 76,102 | 102.2 |
| | | | | Average | 100.0% |
| Example II (Organic) | 1.8 | 1.5 psi | 130,265 | 124,420 | 95.5 |
| | | | 126,420 | 129,650 | 102.5 |
| | | | 125,750 | 126,380 | 100.5 |
| | | | | Average | 99.5% |

EXAMPLE I

An experimental impactor model was fabricated from laboratory glassware, as shown in FIG. 1, comprising a fritted glass filter for the porous impingement target 9, a 1 mm inside diameter glass jet nozzle 15, and a glass centrifuge tube 17 modified, as shown in FIG. 1, to provide a drain 19 for collecting water exuded through the fritted glass.

In one test of this impactor an aerosol was prepared from a radioactively tagged aqueous salt solution having particles of a size range of 0.2 to 2.0 microns diameter suspended in helium. The aerosol was allowed to pass upward through a 0.9 meter column 24 mm inside diameter to remove large droplets. The fraction of the aerosol stream to be collected was carried through a 1 meter length of polyethylene capillary 1.57 mm inside diameter. The aerosol stream was impinged on the water-wet porous disk 9 from a nozzle 1 mm inside diameter at a distance of 2 to 3 mm. Flow rates are shown in the table.

The amount of radioactive aerosol transported through the capillary per unit time was determined by trapping the total flow for a measured time in a glass wool plug 12 mm in diameter by 10 cm long and counting this plug in a well-type gamma scintillation counter. A gamma-emitting nuclide, $^{47}$Ca, was used to tag the liquids from which the aerosols were generated. Complete collection of the aerosol in the glass wool plug was confirmed by the fact that radioactive material was found only in a 1 to 2 cm depth of the 10 cm glass wool plug where the gas stream entered. Next, the aerosol flow was directed to the impactor for a measured time. The liquid collected from the impactor was removed, placed in a 12 mm glass test tube, and counted in the same detector as was the glass wool trap. The water flow rate through the fine glass frit, ~8 mm in diameter, was 0.026 ml/min. Thus, the radioactive material from the gas stream was concentrated in the liquid stream by a factor of approximately $10^5$. Collection efficiencies are shown in the table. A further check on the collection efficiency of the impactor was obtained by filtering the exit gas from the impactor with a glass wool filter and counting the filter for radioactivity. No Although this invention has been illustrated with the use of a water film liquid, various film liquids for separating particulate matter from gas streams are well known in the art and may be used with the structure of this invention to effect efficient separation.

Accordingly, it will be seen that an improved liquid film impingement scrubber has been provided which offers the following advantages: (1) a self-cleaning device, (2) continual removal of material to avoid resuspension, (3) volume reduction in collecting liquid, (4) handling large volumes of aerosol without plugging, and (5) continuous operation.

Various embodiments will be obvious to those skilled in the art from the preceding detailed description of the invention, without departing from the spirit and scope of the invention as set forth in the following claims, attached to, and forming a part of, this specification.

What is claimed is:

1. In an impingement separator for removing particulates from an aerosol including an impingement chamber having a gas inlet and a gas outlet spaced therefrom, a nozzle provided in said gas inlet for jetting said aerosol onto a liquid film covered target for collection of said particulates from the aerosol jet by said liquid film, the improvement comprising:

a container spaced from the gas inlet and gas inlet and having a liquid inlet connected to a liquid supply and containing a pressurized liquid;

at least one liquid-permeable impact target covering an outlet of the container in liquid communication with said container on an inner surface thereof so that a film of said liquid is present over the outer surface of said target formed by said liquid exuding through said target, said target outer surface being disposed confronting said aerosol jet nozzle; and liquid-receiving means in said chamber for receiving said liquid exuded through said target so that said particles collected by said liquid film are continuously removed from said target outer surface into said receiving means.

2. The improved impingement separator as set forth in claim 1 wherein said impact target is a disc of foraminous material which allows said liquid to exude therethrough and has an outer surface over which said film extends, said outer surface being sufficiently smooth to provide minimal surface area.

3. The improved impingement separator as set forth in claim 2 wherein said separator includes a housing comprising said pressurized liquid container an aerosol chamber for receiving said aerosol and said impingement chamber, wherein said at least one liquid-permeable impact target includes a plurality of impact targets disposed in a wall of said housing common to said liquid container and said impingement chamber so that said liquid exudes through each of said targets into said impingement chamber, said impingement chamber being in liquid communication with said receiving means, a plurality of nozzles formed in a wall common to said impingement chamber and said aerosol chamber in fluid communication with said aerosol chamber and aligned with corresponding ones of said plurality of targets for directing jets of said aerosol onto said liquid film at corresponding targets, and means for exhausting the gas from said impingement chamber following impact upon said targets.

4. The improved impingement separator as set forth in claim 3 wherein said gas exhaust means includes a baffle plate disposed within said impingement chamber and having a plurality of oversized openings therein through which corresponding ones of said plurality of nozzles extend toward said impingement targets, allowing the flow of gas from said impingement chamber into an exhaust chamber formed by said baffle plate.

* * * * *